US00RE36312E

United States Patent [19]

Muzzy

[11] E Patent Number: Re. 36,312

[45] Reissued Date of Patent: Sep. 28, 1999

[54] DRUM BRAKE WEAR ADJUSTOR WITH ECCENTRIC ROLLER AND PAWL ASSEMBLY

[76] Inventor: Robert G. Muzzy, H.C.R. 32 - Box 317, Powerhouse Rd., Chittenden, Vt. 05737

[21] Appl. No.: 08/889,305

[22] Filed: Jul. 8, 1997

Related U.S. Patent Documents

Reissue of:

[64] Patent No.: 5,435,419
Issued: Jul. 25, 1995
Appl. No.: 08/105,004
Filed: Aug. 11, 1993

[51] Int. Cl.[6] ..... F16D 51/00

[52] U.S. Cl. ..... 188/79.56; 188/196 BA; 188/196 V; 188/79.62; 74/569

[58] Field of Search ..... 188/79.54, 79.55, 188/79.56, 196 BA, 196 V, 329, 330, 79.62; 74/569, 575, 567

[56] References Cited

U.S. PATENT DOCUMENTS

| | | | |
|---|---|---|---|
| 1,875,064 | 8/1932 | Lyman | 188/79.62 |
| 1,875,065 | 8/1932 | Lyman | 188/79.62 |
| 2,051,920 | 8/1936 | Turgot | 188/332 X |
| 2,194,584 | 3/1940 | Boldt | 188/79.54 |
| 2,237,163 | 4/1941 | Rosenberg | 188/79.57 |
| 2,522,903 | 9/1950 | Shively | 188/79.55 |
| 3,096,856 | 7/1963 | Burnett | 188/332 |
| 3,196,987 | 7/1965 | Moore et al. | 188/330 X |
| 4,071,120 | 1/1978 | Hagin | 188/79.55 |
| 4,249,428 | 2/1981 | Herron et al. | 74/569 |
| 4,343,561 | 8/1982 | Campanini | 188/79.55 X |
| 4,380,276 | 4/1983 | Sweet et al. | 188/79.55 |

(List continued on next page.)

FOREIGN PATENT DOCUMENTS

| | | | |
|---|---|---|---|
| 1356375 | 6/1974 | United Kingdom | 188/330 |

OTHER PUBLICATIONS

Brakes: An Update, Fleet Equipment, vol. 18, No. 19, Oct. 1992.

Euclid Brake Parts Manual, pp. 1–2 to 1–14; 1–18 to 1–30; 1–52 to 1–54, Feb. 1989.

Ford Parts & Service Division, Truck Shop Manual, vol. D, Publication Department, 1989.

International Harvester, CTS–4201, Truck Service Manual S–Series, pp. 1, 6–9, 11, Oct. 1981.

Euclid Industries, Inc., "Brake Service Bulletin B–12," 1981.

(List continued on next page.)

*Primary Examiner*—Robert J. Oberleitner
*Assistant Examiner*—Pamela J. Lipka
*Attorney, Agent, or Firm*—Law Offices of Kenneth F. Dusyn

[57] ABSTRACT

The present invention relates to a cam-operated, self-adjusting brakeshoe adjustor that is utilized in heavy duty air braking vehicles [that] *which* employ single and/or multiple-web brakeshoes. The brakeshoe adjustor includes a roller assembly, a cylindrical roller sleeve, and a pawl assembly. The roller assembly comprises a fixed eccentric roller(s) and spindle arrangement for slidable engagement with a cylindrical roller sleeve(s) which in turn is actuated by the rotation of the cam shaft. At least one portion of the spindle is provided with a ratchet for constant engagement with a mateable pawl. The rotation of the roller sleeve(s) about the eccentric roller(s) is limited by the arcuate distance of a slot contained about the edge of the roller sleeve within which a pin, radially extending from the roller, is engaged. In one embodiment, the pawl assembly comprises (i) at least one bracket sleeve for slidable engagement with a corresponding web end of the brakeshoe and having an opening for slidably receiving one of the extensions of the spindle therethrough; and (ii) at least one pawl secured to the side of the bracket sleeve for engagement with the ratchet about the spindle to permit rotation of the spindle in one direction only, the effect of which will be to restrain the combined spindle and eccentric roller(s) from turning in the direction of actuation of the cam shaft.

60 Claims, 11 Drawing Sheets

U.S. PATENT DOCUMENTS

| | | | |
|---|---|---|---|
| 4,440,268 | 4/1984 | Karlsson | 188/79.55 |
| 4,483,424 | 11/1984 | Keleman | 188/196 BA |
| 4,586,589 | 5/1986 | Idesawa | 188/79.55 |
| 4,880,085 | 11/1989 | Taylor | 188/79.55 |
| 4,895,226 | 1/1990 | Berg et al. | 188/79.55 |
| 4,932,505 | 6/1990 | Epperly | 188/330 |
| 5,036,958 | 8/1991 | Yamamoto | 188/79.55 |
| 5,052,527 | 10/1991 | Stump | 188/79.55 |

OTHER PUBLICATIONS

Euclid Industries, Inc., "Brake Service Bulletin B–18," date unknown.

Euclid Industries, Inc., "Brake Service Bulletin B–20," 1986.

Pp. 1–17 and 1–59, Euclid Brake Manual.

DRUM BRAKE WEAR ADJUSTOR WITH ECCENTRIC ROLLER AND PAWL ASSEMBLY

Matter enclosed in heavy brackets [ ] appears in the original patent but forms no part of this reissue specification; matter printed in italics indicates the additions made by reissue.

BACKGROUND OF THE INVENTION

The present invention relates to a brake adjustment mechanism for adjusting a vehicle brake for wear, and more particularly to an automatic brakeshoe adjustor assembly to accommodate wear of brake linings on cam actuated air brakes of the type commonly employed on large heavy duty vehicles, such as trucks and truck trailers.

The air brakes that are used on heavy duty vehicles generally include an air brake chamber to which air is supplied when the vehicle is subjected to braking. When pressurized air is admitted to the brake chamber, a braking force is transmitted to a cam shaft via the action of a push rod and brake lever. Once the cam shaft is rotated, the cam at the end thereof, commonly an S-cam, simultaneously rotates against a roller engaged at both ends of the brakeshoe webs. This actuation on the respective rollers causes the brakeshoes to be spread apart forcing the brakeshoe lining against the brake drum, thereby causing the wheels of the vehicle to stop.

The brakeshoes generally employed on these types of vehicles can be of two types: a double web and/or a single web brakeshoe. The double web brakeshoe is used for brakes having a greater surface area which generally require a wider shoe and brake lining, and therefore necessitate a greater support in the form of a double web. This form of the brakeshoe is utilized on wheels of trailers and truck vehicles whose loads are substantial. The roller assemblies engaged at the ends of these webs for actuation by the cam shaft are generally made up of a hollow roller embodying a concentric pin axially extending from the roller along the roller's rotational axis, such as those set forth on pages 1–2 to 1–14, 1–18 to 1–30, and 1–52 to 1–54 of the Euclid Brake Parts Manual. The rollers are disposed between the ends of the double webs by having the pins engaged in semi-circular or circular openings positioned at the ends of the webs as illustrated in the parts drawings of the Euclid Brake Parts Manual.

The single web brakeshoe supports a lesser braking surface area for the brake lining and is generally used on the front of the truck where substantial weight loads are not a factor. Accordingly, these brakeshoes use a single web for supporting the shoe and corresponding brake lining. The type of roller assembly employed for actuation by the cam shaft usually consists of a pair of rollers on either side of an end portion of the single web and connected to each other by a pin concentrically fixed to each of the rollers. The exposed portion of the pin between the rollers is engaged in a semi-circular or circular opening in the end portion of the web, as illustrated on pages 1–2 and 1–16 of the Euclid Brake Parts Manual.

The foregoing braking systems used on heavy duty vehicles typically include some form of mechanism that will compensate for and progressively take up the slack that is generated by wear of the brake linings. An adjustment is needed because the clearance that normally exists between the brake drum and brakeshoe lining will eventually increase beyond a preset limit due to the wear of the brakeshoe lining.

When these brakeshoe linings wear, the push rod of the air brake chamber has to be extended or pushed further to rotate the cam shaft against the brakeshoes to compensate for the increased clearance. The Department of Transportation imposes strict requirements for the clearance limits depending on the size and configuration of the braking system employed.

Common forms of brake adjustors generally employed include slack adjustors, which are usually positioned between the push rod and the cam shaft. Other forms include self adjusting brake adjustors that operate more directly at or near the brakeshoe(s) to compensate for wear. The present invention falls within this latter class of brake adjustors, and typical disclosures may be found in U.S. Pat. Nos. 1,875,064 and 1,875,065, both issued to Lyman (1932); U.S. Pat. No. 2,522,903 issued to Shively (1950); and U.S. Pat. No. 4,586,589 issued to Idesawa (1986). Unfortunately, the mechanisms disclosed therein contain a multitudinous number of parts, require extensive assembly and disassembly when the brakes are subjected to routine maintenance, and require extensive and frequent maintenance themselves by the replacement of worn, misaligned or failed parts which can lead to a costly and time consuming practice. These factors render the foregoing devices impractical for extensive and reliable use.

What is needed then is a self adjusting brakeshoe adjustor that consists of a minimum number of parts, is relatively inexpensive to manufacture, and which is dependable and reliable in its construction. It is also desirable that such a device be easily incorporated into existing braking configurations, installed or removed without disassembly, one that requires minimal maintenance, and optimally, one which can operate with or without the existence of an automatic slack adjustor.

The foregoing desirable characteristics of a self adjusting brake adjustor are accomplished by the invention herein which is described below.

SUMMARY OF THE INVENTION

The present invention provides a brakeshoe adjustor that is self adjusting and actuated by a cam shaft usually found in a vehicle air braking system. The brakeshoe adjustor according to the invention is preferably utilized in heavy duty air braking vehicles that employ single and/or multiple-web brakeshoes, the latter usually being double web brakeshoes. In both arrangements, the adjustor is deployed intermediate to the end of each brakeshoe web and a cam of a cam shaft for simultaneous actuation by the cam shaft.

For the double web brakeshoe, the brakeshoe adjustor includes a roller assembly, a cylindrical roller sleeve, and a pawl assembly. The roller assembly comprises a fixed eccentric roller and spindle arrangement for engagement with the cylindrical roller sleeve. The eccentric roller fixedly embodies a spindle eccentrically extended on both ends thereof for engagement with the end portions of each web of the brakeshoe. At least one portion of the spindle is provided with ratchet means for constant engagement with a mateable pawl. The ratchet means can be in the form of ratchet teeth disposed on the surface of the spindle extension or an annular ratchet wheel having ratchet teeth disposed about the wheel and concentrically mounted and secured to the spindle for engagement with the mateable pawl.

As noted above, a cylindrical roller sleeve is provided which is slidably mounted onto the eccentric roller. Means are also provided for limiting the rotation of the sleeve about the eccentric roller by a predetermined amount when the sleeve is actuated by the cam shaft. The roller sleeve preferably include at least one arcuate slot within one or both ends thereof for receiving a corresponding number of pins extending from one or both proximate ends of the eccentric roller to permit a corresponding arcuate rotation of the roller sleeve about the roller when the sleeve is actuated by the cam of a cam shaft, preferably an S-cam. The rotation of the roller sleeve about the eccentric roller is therefore limited by the protrusion of the pin extending from the roller into the arcuate slot of the roller sleeve. Multiple arcuate slots in each circumferential end of the roller sleeve, along with a corresponding number of pins extending from the eccentric roller, can also be provided to ensure the secure limited rotation of the roller sleeve about the eccentric roller, and also for fixedly securing the spindle within the roller if the spindle and roller are manufactured from separate components.

The brakeshoe adjustor further comprises a pawl assembly which in one embodiment may include (i) at least one bracket sleeve for slidable engagement with a corresponding web end of the brakeshoe and having an opening for slidably receiving one extension of the spindle therethrough; and (ii) at least one pawl secured to the side of the bracket sleeve for engagement with the ratchet means about the spindle extension to permit rotation of the spindle in one direction only, which will generally be to restrain the combined spindle and eccentric roller from turning in the direction of actuation of the cam shaft.

Another embodiment for the pawl assembly includes more than one bracket sleeve with the multi-webbed or double-webbed brakeshoe, one for mounting onto each web end to engage both the respective extensions of the spindle from the eccentric roller. Ratchet means are then provided about both spindle extensions, such as ratchet teeth about the ends thereof or annular ratchet wheels concentrically mounted onto the spindle extensions, for engagement with the respective pawl(s) secured to the side of each bracket sleeve.

As an alternative to the bracket sleeve, the pawl assembly can include a pawl mounted directly to the side of the web end of the brakeshoe for respective engagement with the ratchet means about the spindle extension(s). Constant engagement of the pawl with the ratchet means is required and is maintained by the constant engagement of the cam with the roller sleeve, which in turn holds the spindle extensions to the web ends of the brakeshoe by appropriately shaped openings about the web ends for receiving the spindle extensions therein. Constant engagement of the pawl with the ratchet means may also be obtained by the use of a spring clip disposed about the spindle extensions and secured to the web end. At least one pawl can be positioned on the side of both webs for engagement with the respective ratchet means provided about both spindle extensions.

The bracket sleeve is used to permit incorporation of the brakeshoe adjustor herein onto existing double webbed brakeshoes without any modification to the brakeshoe web, e.g., in the situation where a pawl or plurality of pawls are mounted directly to the web itself. As already noted, constant engagement of the pawl with one of the ratchet teeth of the ratchet means is required for the successful operation of the brakeshoe adjustor according to the invention herein.

For the single web brakeshoe configuration, the brakeshoe adjustor comprises a roller assembly, a cylindrical roller sleeve, and a pawl assembly. The roller assembly comprises a pair of eccentric rollers axially separated by and fixedly secured to a spindle for engagement of the spindle with the end portion of the brakeshoe web at a point between the eccentric rollers. The spindle is provided with ratchet means disposed about at least one portion thereof, and may be positioned about a point between the eccentric rollers or about one or both ends of the spindle if the spindle is extended beyond the eccentric rollers, for engagement with a corresponding number of pawls to restrain the rollers and spindle from turning in the direction of actuation of the cam shaft.

A pair of cylindrical roller sleeves are provided for slidably receiving each of the corresponding eccentric rollers therein. Means are also provided for limiting the rotation of the sleeve about the eccentric roller by a predetermined amount when one or both sleeves is actuated by the cam shaft. This is preferably accomplished by providing at least one arcuate slot about an end of at least one of the sleeves, preferably both, to receive a corresponding number of pins extending from a proximate end of the respective eccentric roller to permit corresponding arcuate rotation of the sleeve about its respective roller when one or both roller sleeves are tangentially engaged and actuated by the cam of the cam shaft. While it is desirable to have both roller sleeves provided with at least one arcuate slot about one or both ends thereof, only one roller sleeve need have the arcuate slot and pin combination about an end thereof for the operation of the brakeshoe adjustor according to the invention herein. In this case, the roller sleeve that is without the slot can be held into place on its respective eccentric roller by any conventional means known in the art, for example, by the employment of a cotter pin, snap ring, etc.

In one embodiment for the single web brakeshoe, the pawl assembly comprises (i) a bracket sleeve for slidable engagement with the end portion of the single web and having at least one opening for slidably receiving the spindle therethrough and beyond at least one of the eccentric rollers; and ii) at least one pawl secured to one or both sides of the bracket sleeve for engagement with a ratchet means disposed about the spindle portion extended beyond one or both rollers, as in the double web configuration, to permit rotation of the roller sleeves about their respective eccentric rollers in one direction only, which will generally be to restrain the spindle and eccentric rollers, which are in fixed engagement with respect to each other, from turning in the direction of actuation of the cam shaft. The ratchet means may be in the form of ratchet teeth provided about one or both spindle extensions, or annular ratchet wheels fixedly mounted onto the spindle extension(s), for engagement with the respective pawl(s) secured to one or both sides of the bracket sleeve.

As an alternative to the bracket sleeve, the pawl assembly can include at least one pawl mounted directly to one or both sides of the web end of the brakeshoe for respective engagement with the ratchet means disposed about one or both of the spindle extensions. Constant engagement of the pawl with the ratchet means of the spindle may be maintained by the constant engagement of the cam with the roller sleeve, which in turn holds the spindle to the web end of the brakeshoe at a point between the eccentric rollers, or by the use of a spring clip disposed about the spindle and secured to the web end.

In order to avoid extending the spindle beyond either or both eccentric rollers of the roller assembly, the foregoing annular ratchet wheels of the ratchet means may be employed interior of the eccentric rollers for engagement with the respective pawl(s) secured to one or both sides of the single web or bracket sleeve, as the case may be.

Inasmuch as there are two brakeshoes employed for each brake assembly on a given wheel, two brakeshoe adjustors according to the invention will be employed in the brake assembly, one at the end portion of each brakeshoe for simultaneous actuation by the cam shaft.

In operation, the push rod of the braking system is depressed which causes the brake lever to rotate the cam shaft. The cam in turn simultaneously actuates both of the roller sleeves at each end of the brakeshoe web, which in turn forces the brakeshoes and their respective linings outward into contact with the brake drum. The arcuate slot in the roller sleeve accommodates the permissible critical distance that the sleeve must travel for the brakeshoe lining to make contact with the brake drum when the brakes are applied.

As the lining of the brakeshoes wear, the roller sleeves will have to rotate a greater arcuate distance about the eccentric roller. Eventually, the sleeve will become engaged with the pin extending from the eccentric roller to cause a rotation of the rollers about their respective spindles. Once the spindles are rotated, the pawl will encounter the next ratchet tooth of the ratchet means and restrain the spindle and eccentric roller from moving in the direction of actuation of the cam shaft. In this manner, the distance that the push rod must be depressed will always stay within the limits of brake specifications as reflected by the arcuate length of the slot within the roller sleeve. Thus, the brakes will maintain their adjustment and be self adjusting to accommodate wear of the brakeshoe linings.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENTS

The following is a description of a preferred embodiment of the self adjusting brakeshoe adjustor according to the invention herein for use with a cam operated double web brakeshoe that is typically employed in the trailer and/or truck portion of a heavy duty vehicle.

Figure 1:
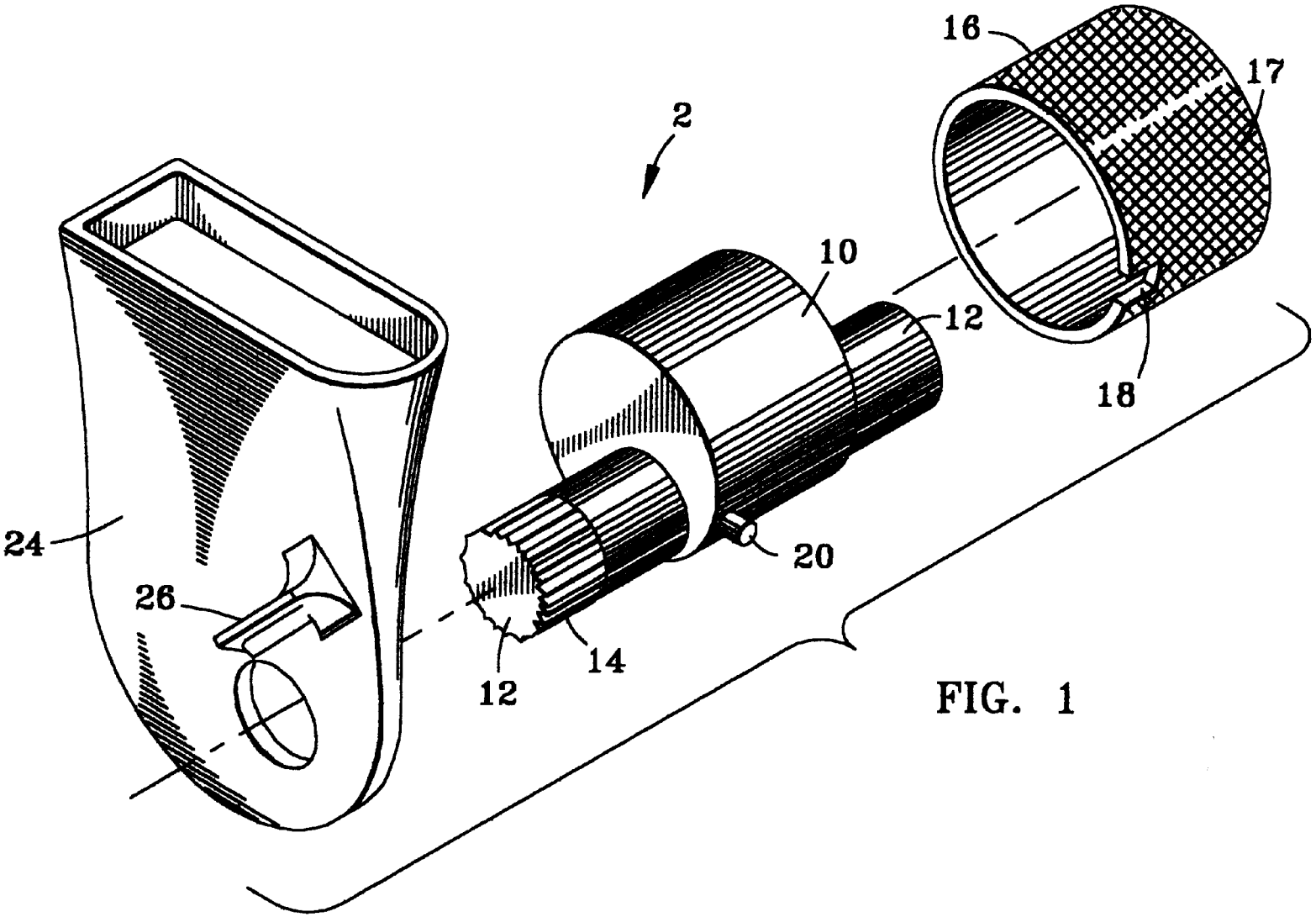
FIG. 1 is an exploded isometric perspective view of a self adjusting brakeshoe adjustor according to the invention for use with a conventional double webbed brakeshoe of a cam operated air brake for a heavy duty vehicle.

Referring to FIG. 1, a self adjusting brakeshoe adjustor 2 is shown in an exploded perspective view wherein a roller assembly is provided comprising a cylindrical eccentric roller 10 mounted onto a spindle 12 extended on both ends of the eccentric roller. A hollow cylindrical roller sleeve 16 is also provided to slidably receive eccentric roller 10 therein for rotational engagement therewith. Roller sleeve 16 contains a slot 18 at one proximate end for engagement with a pin 20 inserted into (with a press fit, or by any other conventional means known in the art) and extending from the roller 10 to limit rotational movement of the roller sleeve 16 relative to the roller 10 by the length of the arcuate slot 18.

Figure 1A:
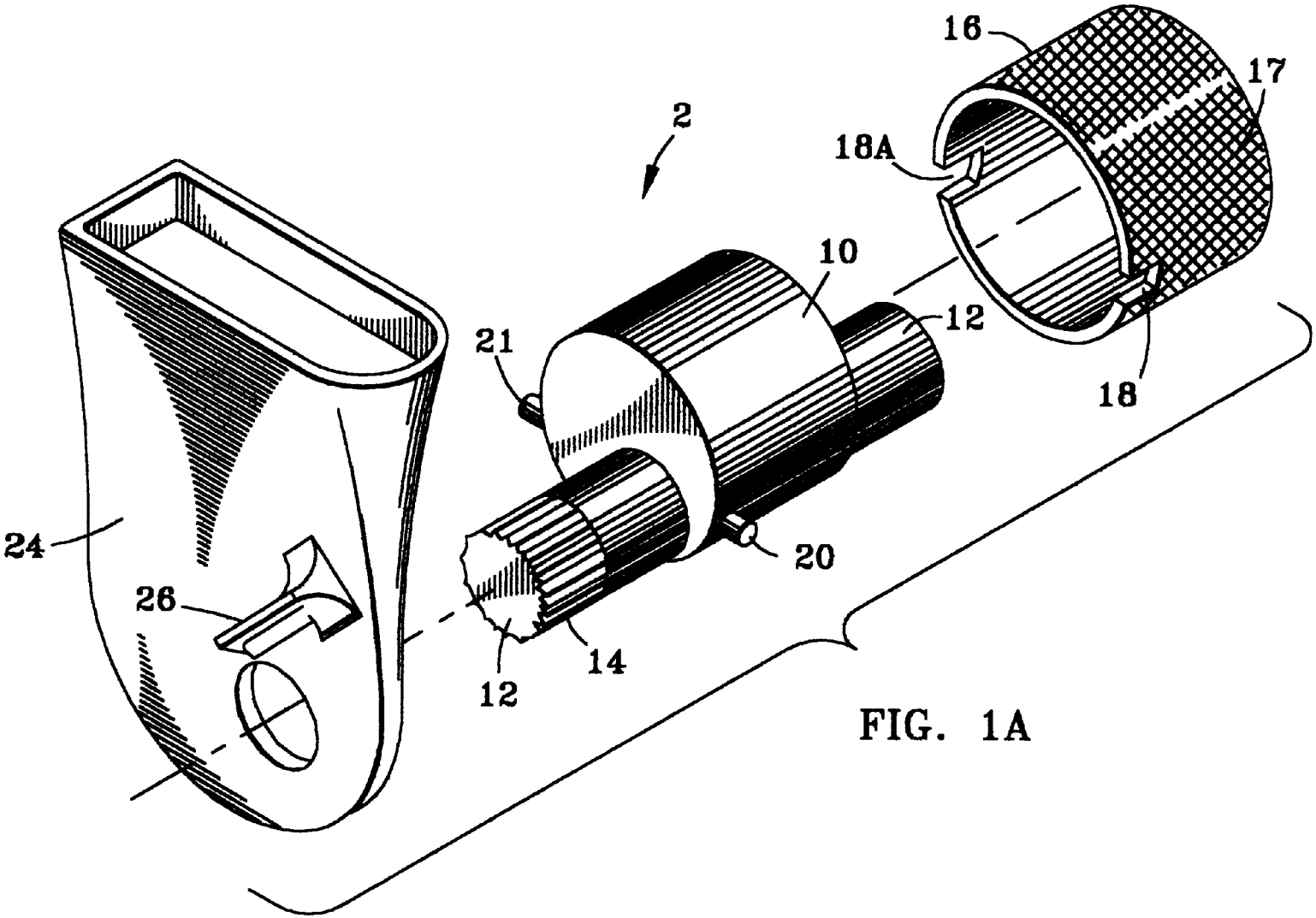
FIG. 1A is an exploded isometric perspective view of an alternative embodiment of the brakeshoe adjustor shown in FIG. 1.

As shown in FIG. 1A, an additional pin 21 may optionally be inserted into eccentric roller 10, which is circumferentially equidistant from pin 20, for engagement with a corresponding slot 18A provided about the edge of sleeve 16. Any number of pins and corresponding sleeve slots may be employed to insure engagement of roller 10 with sleeve 16.

Spindle 12 and eccentric roller 10 may be fabricated as a one piece construction, or as two separate units in which case the spindle 12 can be inserted into an off center opening of roller 10, and then fixed within roller 10 by means of pin 20 inserted through spindle 12 and into the roller. In the latter case, pin 20 will serve the dual function of maintaining spindle 12 and roller 10 in fixed engagement with respect to each other and limiting the rotational movement of roller 10 within the roller sleeve 16 by the arcuate distance of slot 18. In either case, care should be taken not to have pin 20 extend beyond the outside diameter of roller sleeve 16 to avoid impingement with the surface of S-cam 30 (illustrated in FIG. 2).

Figure 3:
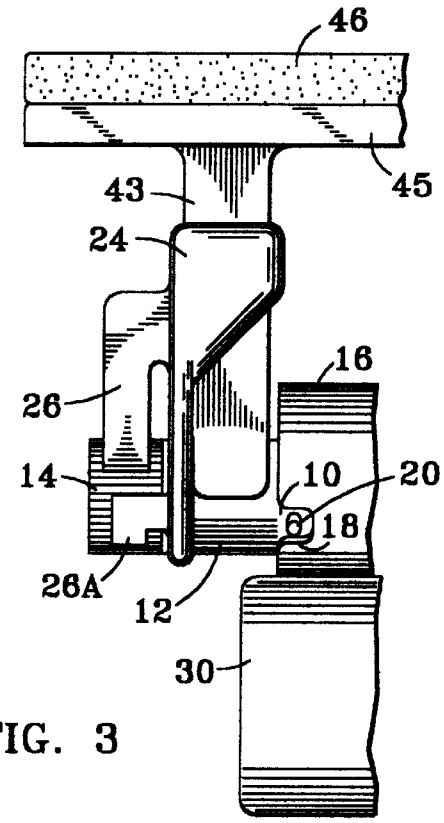
FIG. 3 is a detailed front elevational plan view of the left portion of the upper brakeshoe illustrated in FIG. 2.
Figure 2:
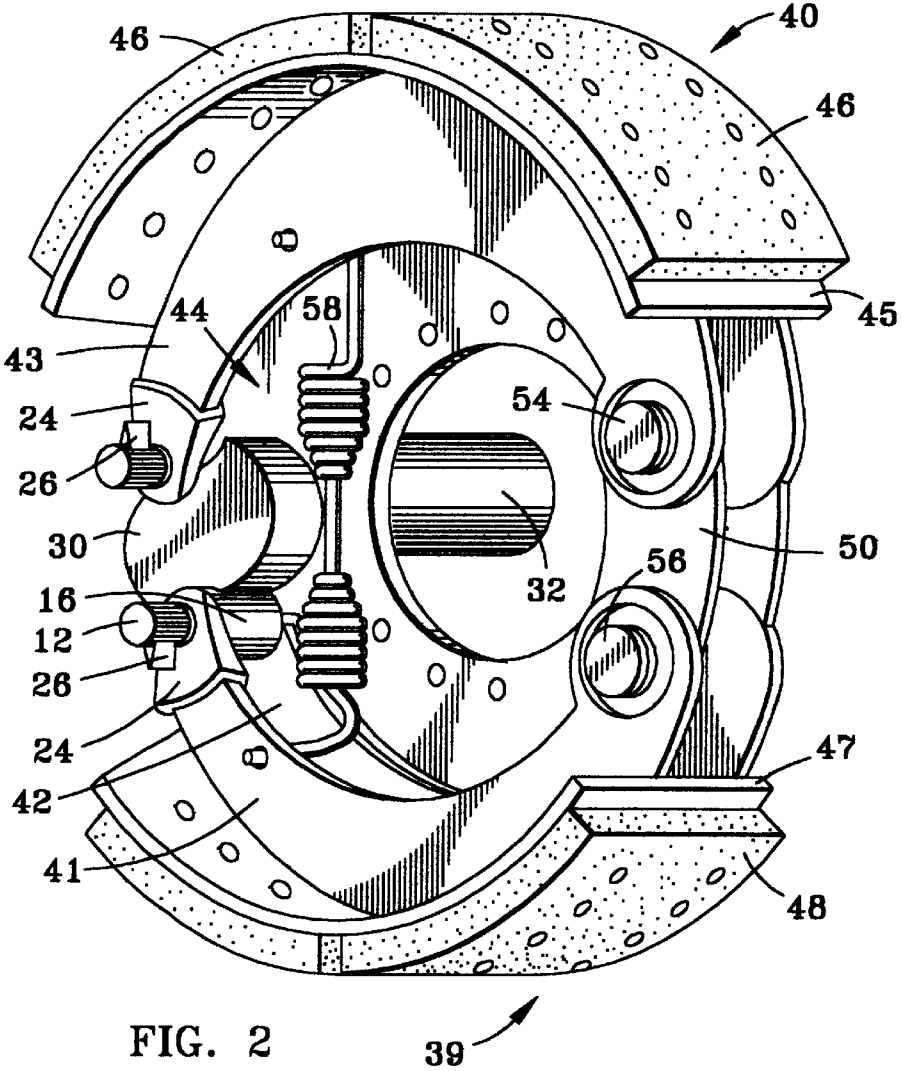
FIG. 2 is an isometric perspective view of assembled cam operated, double webbed air brakeshoes of a heavy duty vehicle incorporating the brakeshoe adjustor shown in FIG. 1.
Figure 4A:
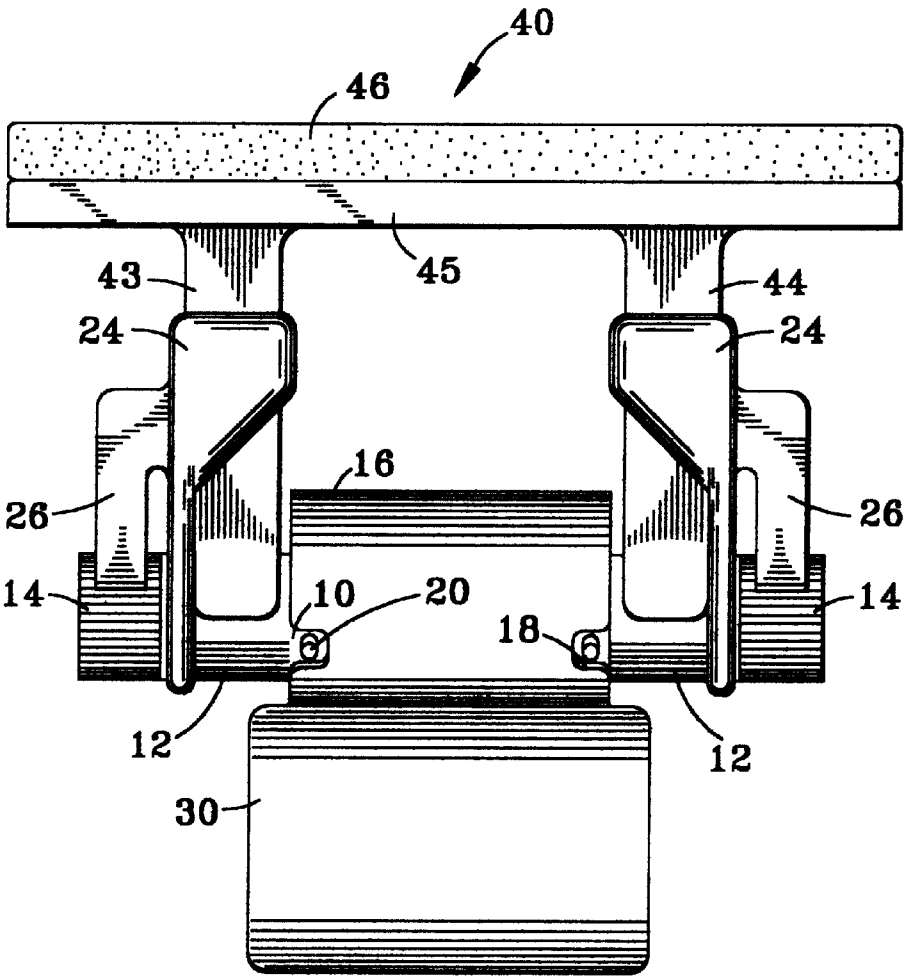
FIG. 4A is an alternative embodiment of the brakeshoe adjustor used for the upper brakeshoe illustrated in FIG. 2 according to the invention herein.
Figure 9:
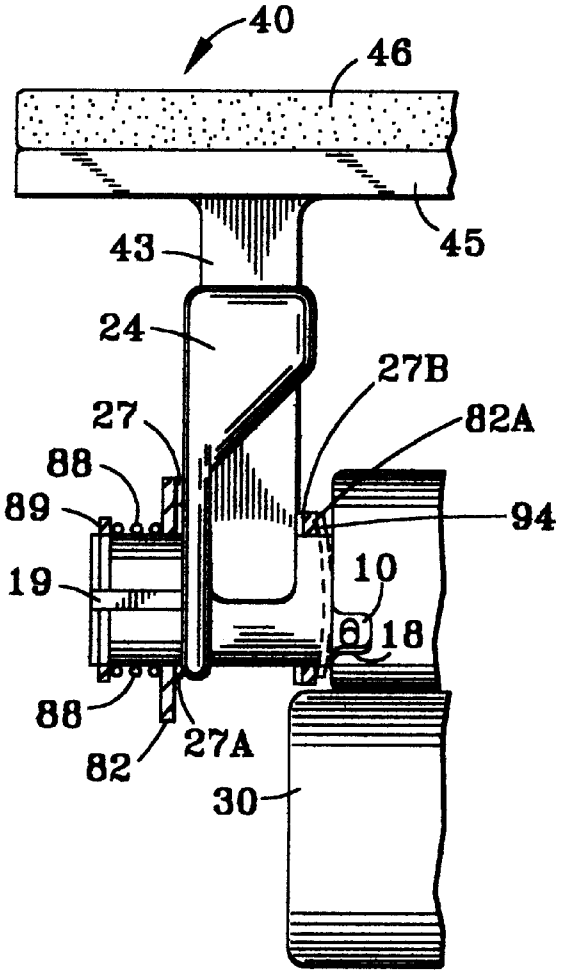
FIG. 9 is a front elevational plan view of the left portion of the upper brakeshoe illustrated in FIG. 2 incorporating the alternative pawl assembly embodiment shown in FIG. 8.

One portion of the spindle 12 is provided with a plurality of ratchet teeth 14 about its surface for continuous engagement with a mateable pawl 26 mounted to the side of a bracket 24. This is accomplished by the circular opening in bracket 24 adapted in size to slidably receive the ratcheted portion of spindle 12 therethrough. As illustrated in FIGS. 2, 3 and 9, bracket 24 is also sized and configured to slidably mount onto the web ends 41 and 43 of double web brakeshoes 39,40 for accommodating the disposition of the self adjusting brakeshoe adjustor between webs 43,44 and 41,42 for engagement with S-cam 30. It is to be noted that double web brakeshoe 40 can accommodate a bracket 24 on each web end as illustrated in FIG. 4A. In this case a plurality of ratchet teeth 14 is provided to both ends of spindle 12 for engagement with pawl 26 secured to each bracket 24 which in turn is slidably mounted to the end of webs 43 and 44. As an optional embodiment, an additional pawl 26A may be mounted to bracket 24 as shown in FIG. 3, to insure engagement with ratchet teeth 14. Securement of both ends of spindle 12 to the web of the brakeshoe by means of bracket 24 is important to insure and maintain continuous engagement of the pawl 26 with any one of ratchet teeth 14 on spindle 12 (FIGS. 2 and 3).

FIG. 2 illustrates the assembly of conventional double web brakeshoes 39 and 40 in a heavy duty vehicle incorporating the self adjusting brakeshoe adjustors shown in FIG. 1. Double web brakeshoes 39 and 40 are operatively joined to each other at one end in a hinged arrangement by means of pins 54 and 56 inserted through brake spider 50 for engagement with webs 41,42 and 43,44 which engage the self adjusting brakeshoe adjustors at the opposite ends. Brakeshoe spring 58 insures continuous return of the brakeshoes to their original position after engagement with the brake drum.

As shown in FIG. 2, two self adjusting brakeshoe adjustors, one for each end of the double web of each brakeshoe 39 and 40, are required to make up the entire double web brake assembly. The roller sleeves 16 of each self adjusting brakeshoe adjustor for brakeshoes 39 and 40 are brought to bear on S-cam 30 by means of brakeshoe spring 58 which insures continuous engagement of the S-cam with the roller sleeves. Upon actuation of the brake pedal by the driver of the heavy duty vehicle, rotational movement of S-cam 30 by cam shaft 32 exerts a force on the respective roller sleeves 16 to cause brakeshoes 39 and 40 to expand outwardly into contact with the brake drums (not shown), which in turn causes a braking of the vehicle.

Figure 4:
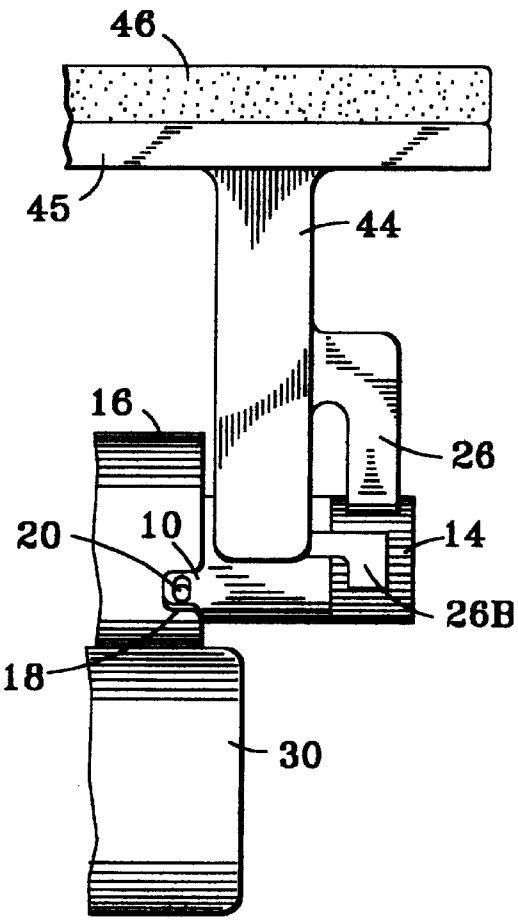
FIG. 4 is a front elevational plan view of the right portion of the upper brakeshoe illustrated in FIG. 2, additionally showing an alternative embodiment of the brakeshoe adjustor according to the invention herein.

FIG. 4 shows an alternative embodiment for the engagement of pawl 26 with ratchet teeth 14 of spindle 12, which differs from the arrangement shown in FIG. 3 in that pawl 26 is fixed directly to the side of web 44 (as opposed to pawl 26 being fixed to bracket 24 in FIG. 3). As an optional embodiment, pawl 26B may be mounted to the lower or end portion of web 44 as an added insurance for engagement with ratchet teeth 14. The self adjusting brakeshoe adjustor is held into place between and at the lower end of webs 43 and 44 by the engagement of roller sleeve 16 with the S-cam 30. The advantage of this configuration is that the need for bracket 24 as an extra component of the self adjusting brakeshoe adjustor is obviated. The advantage of the configuration shown in FIG. 3 utilizing bracket 24 is that the self adjusting brakeshoe adjustor can be easily incorporated into existing brake assemblies without the need for redesigning the brakeshoe webs for incorporation of pawl 26. Bracket 24 also provides additional support for securing spindle 12 into place between webs 43 and 44.

In accordance with another aspect of the invention, the bracketed configuration for brakeshoe web 43 illustrated in FIG. 3 can be duplicated for brakeshoe web 44 of FIG. 4. That is, an additional bracket, having a mirror image of bracket 24, with a corresponding pawl identical to pawl 26, can be made a part of the self adjusting brakeshoe adjustor for engaging ratchet teeth 14 and for securing spindle 12 to web 44. The additional bracket and pawl assembly, which mounts onto web 44 in the same manner as bracket 24 mounts onto web 43, will provide added insurance for the proper functioning of the self adjusting brakeshoe adjustor.

Figure 8:
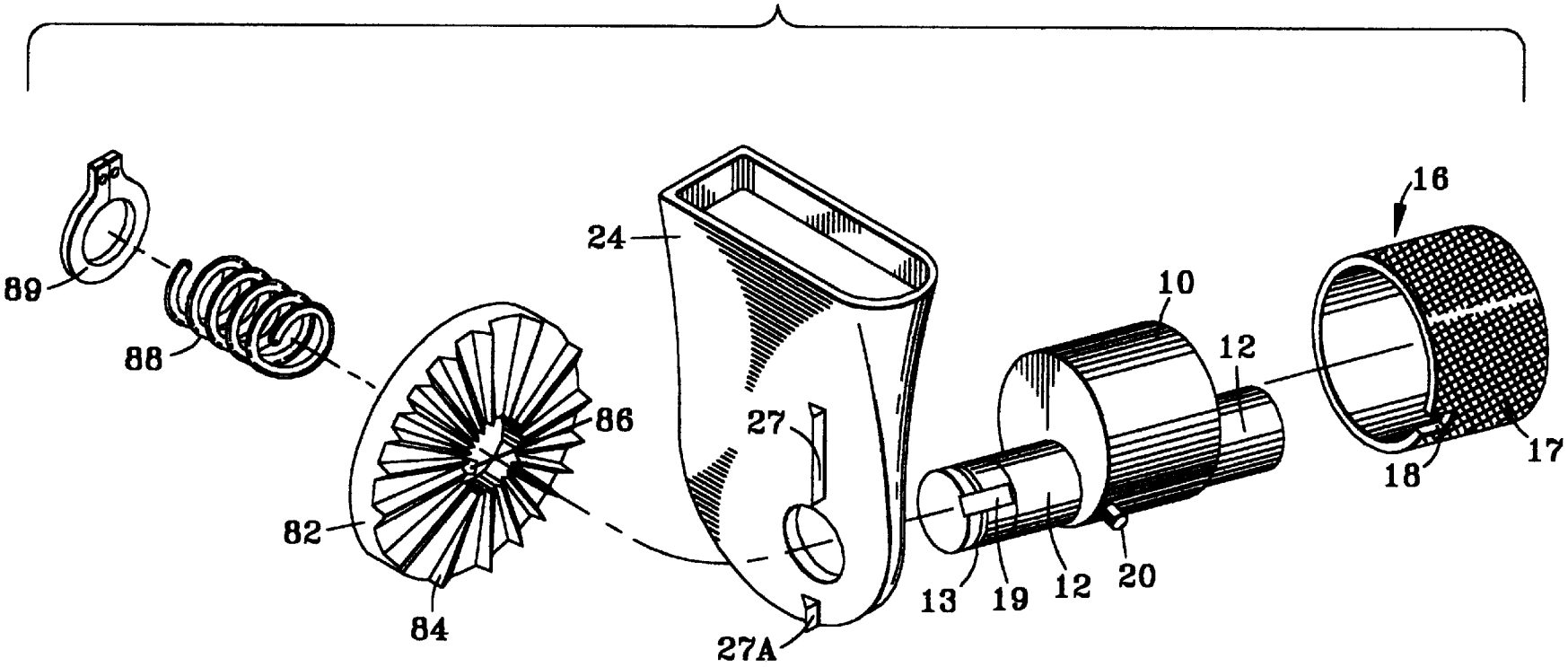
FIG. 8 is an exploded isometric perspective view of the brakeshoe adjustor shown in FIG. 1 incorporating an alternative embodiment of the pawl assembly.

An alternative arrangement for the pawl assembly is illustrated in FIG. 8 wherein an annular ratchet wheel 82 is provided for slidable engagement with spindle 12, the ratchet wheel being provided with a plurality of ratchet teeth 84 radially extending from substantially the wheel's inner circumference to its outer circumference on the side of the wheel facing the pawl. A key member 86, extending inwardly from the inner circumference of the annular wheel 82, is provided for engaging a corresponding key slot 19 incorporated into the surface of spindle 12 such that when ratchet wheel 82 is slidably mounted onto spindle 12, the ratchet wheel is rotatably fixed in place and prevented from rotating about spindle 12. As will be seen in FIG. 9, one of the ratchet teeth 84 will engage pawl 27 mounted to bracket 24 when the ratchet wheel is concentrically mounted onto spindle 12 and moved up against bracket 24. In order to maintain constant engagement of the ratchet wheel with pawl 27, a coil spring 88 is slidably mounted onto spindle 12, followed by a circular locking ring 89, for urging the ratchet wheel 82 against bracket 24. A slot 13 is provided about the circumferential surface of spindle 12 (see FIG. 8) for fixedly securing the locking ring 89 in place. Additional pawls, such as that shown by reference numeral 27A, may be added to bracket 24 to insure proper alignment of the ratchet wheel with pawls 27 and 27A. Any number of pawls may be added about bracket 24 (or about web end 44 in FIG. 10).

Figure 10:
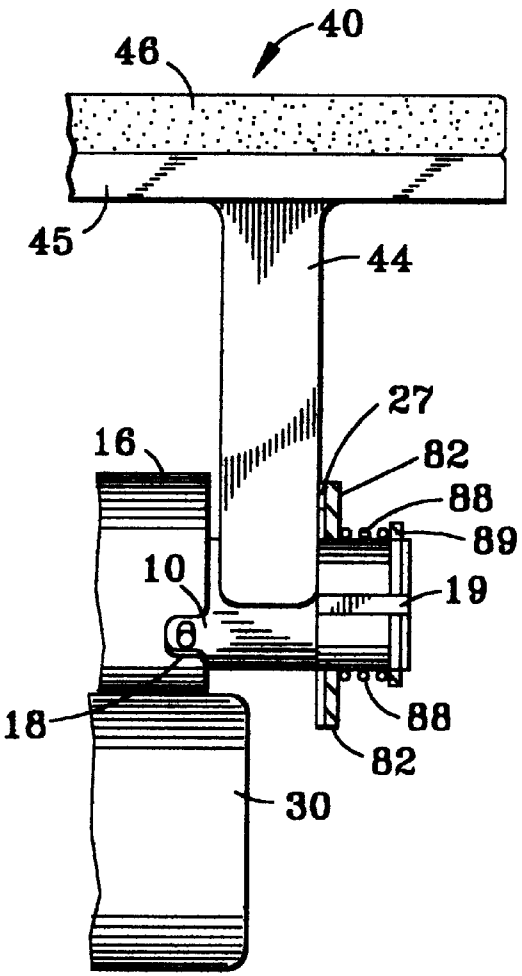
FIG. 10 is a front elevational plan view of the right portion of the upper brakeshoe illustrated in FIG. 2 incorporating an alternative embodiment of the pawl assembly shown in FIG. 9.

The pawl assembly utilizing the annular ratchet wheel configuration (as illustrated in FIGS. 8, 9 and 10) offers an economical advantage in that the pawl assembly takes up less space. It also permits the ratchet means to be utilized between web 43 (and/or 44) and roller sleeve 16, as is illustrated by ratchet wheel 82A engaged with pawl 27B and held in place by disc spring 94.

The foregoing alternative arrangement for the pawl assembly can be modified as shown in FIG. 10 wherein the above-identified pawl(s) can be attached directly to each side of web 44 itself, thereby eliminating the need for the bracket configuration shown in FIG. 9. One configuration does not preclude the use of the other, and any of the pawl assemblies can be used in combination with each other, such as, for example, a combination of the arrangements shown in FIGS. 9 and 10.

Next follows a description of a preferred embodiment of the self adjusting brakeshoe adjustor when used with a cam operated single web brakeshoe which is typically employed in the front axle portion of a heavy duty vehicle.

Figure 5:
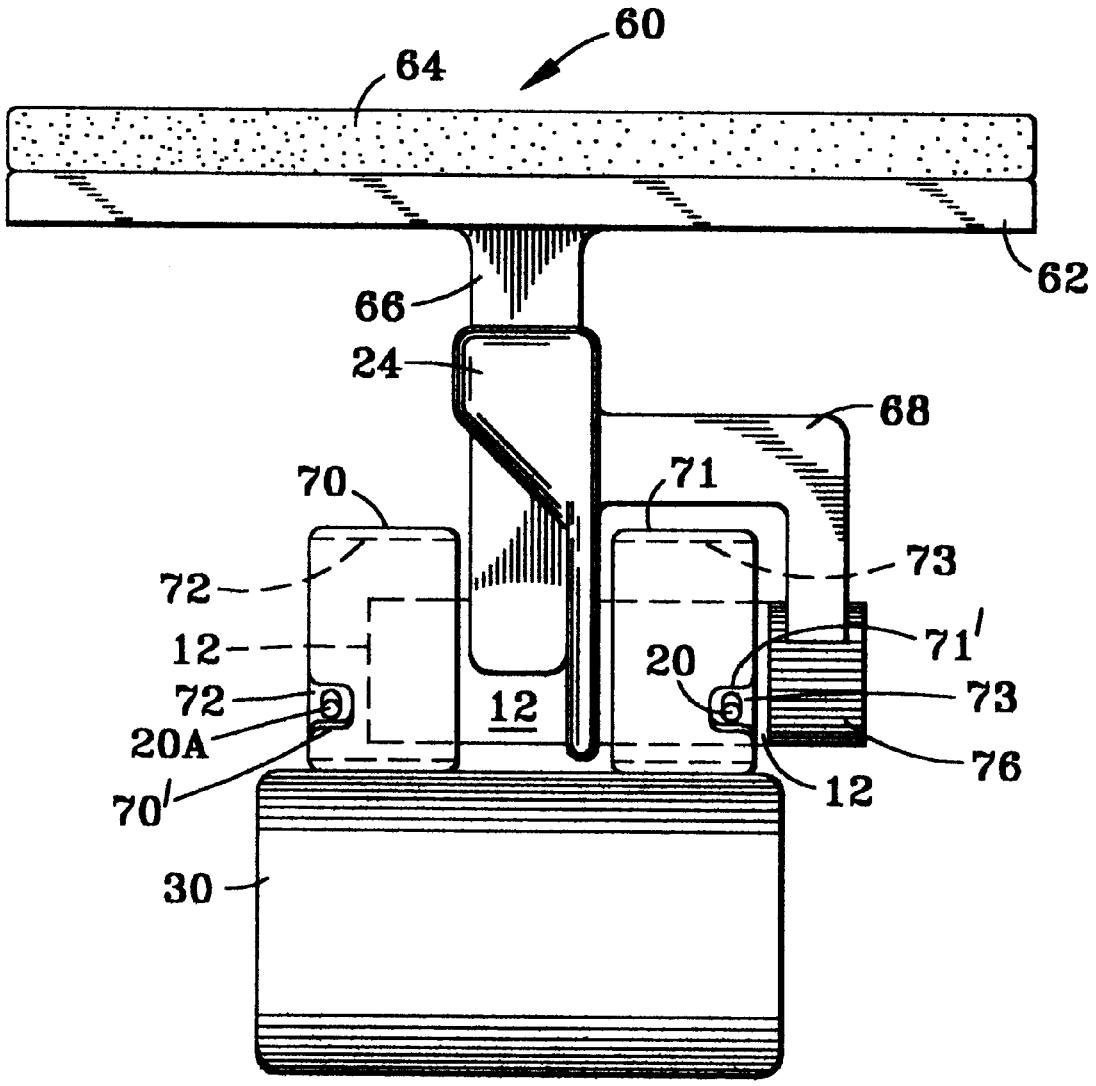
FIG. 5 is a front elevational plan view of a self adjusting brakeshoe adjustor according to the invention which is adapted for use with a single web brakeshoe of a cam operated air brake for a heavy duty vehicle.
Figure 6:
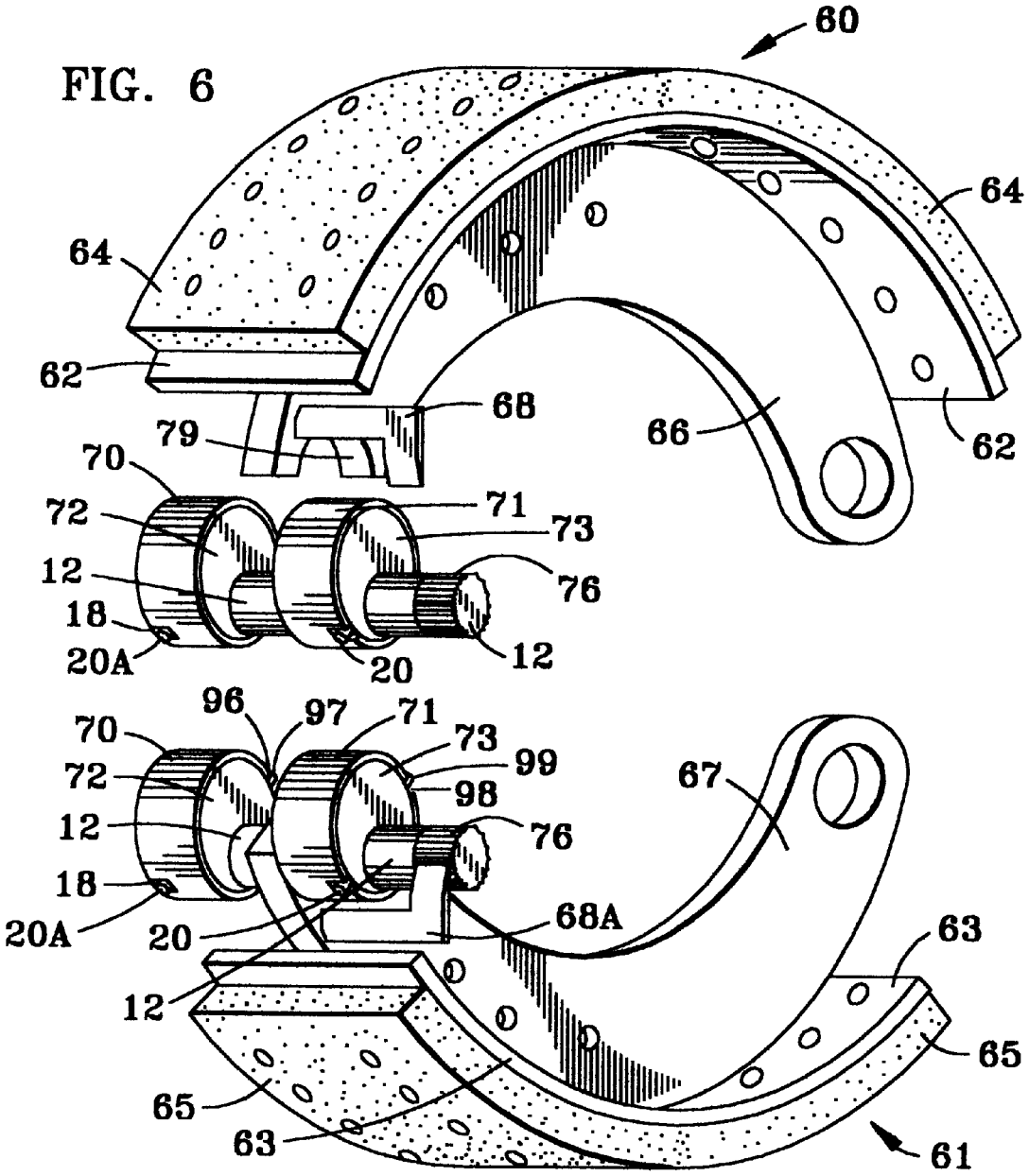
FIG. 6 is an exploded isometric perspective view of a pair of single web brakeshoes incorporating an alternative embodiment of the brakeshoe adjustor according to the invention without the use of the bracket sleeve 24 shown in FIG. 5.

Referring to FIG. 6, a single web brakeshoe assembly is illustrated showing the incorporation of a pair of corresponding self adjusting brakeshoe adjustors according to the invention herein. As shown in greater detail in FIG. 5, a spindle 12 is provided having a pair of eccentric rollers 72 and 73 eccentrically and fixedly engaged therewith in a spaced apart relationship. Spindle 12 extends through and beyond roller 73, whereas the opposite end is inserted in and fixed within roller 72. A corresponding pair of hollow cylindrical roller sleeves 70 and 71 are provided and adapted to receive rollers 72 and 73, respectively, therein, for rotational engagement with their counterparts. As illustrated in FIG. 5, roller sleeve 71 contains a slot 71' at its outer edge for engagement with pin 20 fixedly secured in and extending from roller 73 to limit rotational movement of roller sleeve 71 relative to roller 73 by the length of the arcuate slot 71'. In similar fashion, roller sleeve 70 on the opposite side of web 66, contains a slot 70' at its outer edge for engagement with pin 20A secured in and extending from roller 72 to limit rotational movement of roller sleeve 70 relative to roller 72 by the length of the arcuate slot 70'. Pins 20A and 20 are press fitted into rollers 72 and 73, respectively, after roller sleeves 70 and 71 are mounted onto to their counterpart rollers. Arcuate slots 70' and 71' are equidistant to provide synchronous rotational movement of both roller sleeves about respective eccentric *rollers 70 and 71 when acted upon by S-cam 30. As shown in bottom brakeshoe 61 illustrated in FIG. 6, additional arcuate slots 96, 98, and corresponding pins 97, 99, may be added about the outer ends of roller sleeves 70 and 71, preferably equidistant from pins 20 and 20A, respectively. This arrangement will strengthen and insure the engagement of pins 20A and 20 with roller sleeves 70 and 71, respectively.*

Spindle 12 and rollers 72 and 73 may be fabricated as a one piece construction, or as three separate units in which case the spindle 12 can be inserted through an off center (eccentric) opening of roller 73, and into an identical opening within (but not all the way through) roller 72. Spindle 12 is fixed within roller 72 by any conventional means (such as by a spline or key arrangement) and within roller 73 by means of extended pin 20 which can be press-fit through roller 73 and into spindle 12 after the respective sleeves are mounted onto spindle 12. With this latter arrangement, pin 20 will serve the dual function of (i) maintaining spindle 12 and roller 73 in fixed engagement with respect to each other, and (ii) limiting the rotational movement of roller 73 within the roller sleeve 71 by the arcuate distance of slot 20. Pin 20A will likewise serve to restrict the rotational movement of roller sleeve 70 about roller 72 by the arcuate distance of slot 70'.

The portion of spindle 12 extending beyond the roller assembly of rollers 70 and 71 is provided with a plurality of ratchet teeth 76 about its surface for continuous engagement with a mateable pawl 68 mounted to the side of a bracket identical to the bracket 24 shown in FIGS. 1 and 3. As in FIGS. 1 and 3, this is accomplished by the circular opening in bracket 24 which is sized to slidably receive the ratcheted portion of spindle 12 therethrough. Bracket 24 is then slidably mounted onto single web 66 of brakeshoe 60, which includes brakeshoe lining 64 and brakeshoe lining support plate 62, for positioning the brakeshoe adjustor onto the end of web 66 for engagement with S-cam 30. Securement of spindle 12 to the web of the brakeshoe by means of bracket 24 insures the continuous engagement of pawl 68 with any one of ratchet teeth 76 on the extended end of spindle 12, although when assembly of the brakeshoe is complete, the action of S-cam 30 on rollers 70 and 71 will serve to keep the adjustor assembly in place in the half moon opening 79 on the end of web 66.

Figure 7:
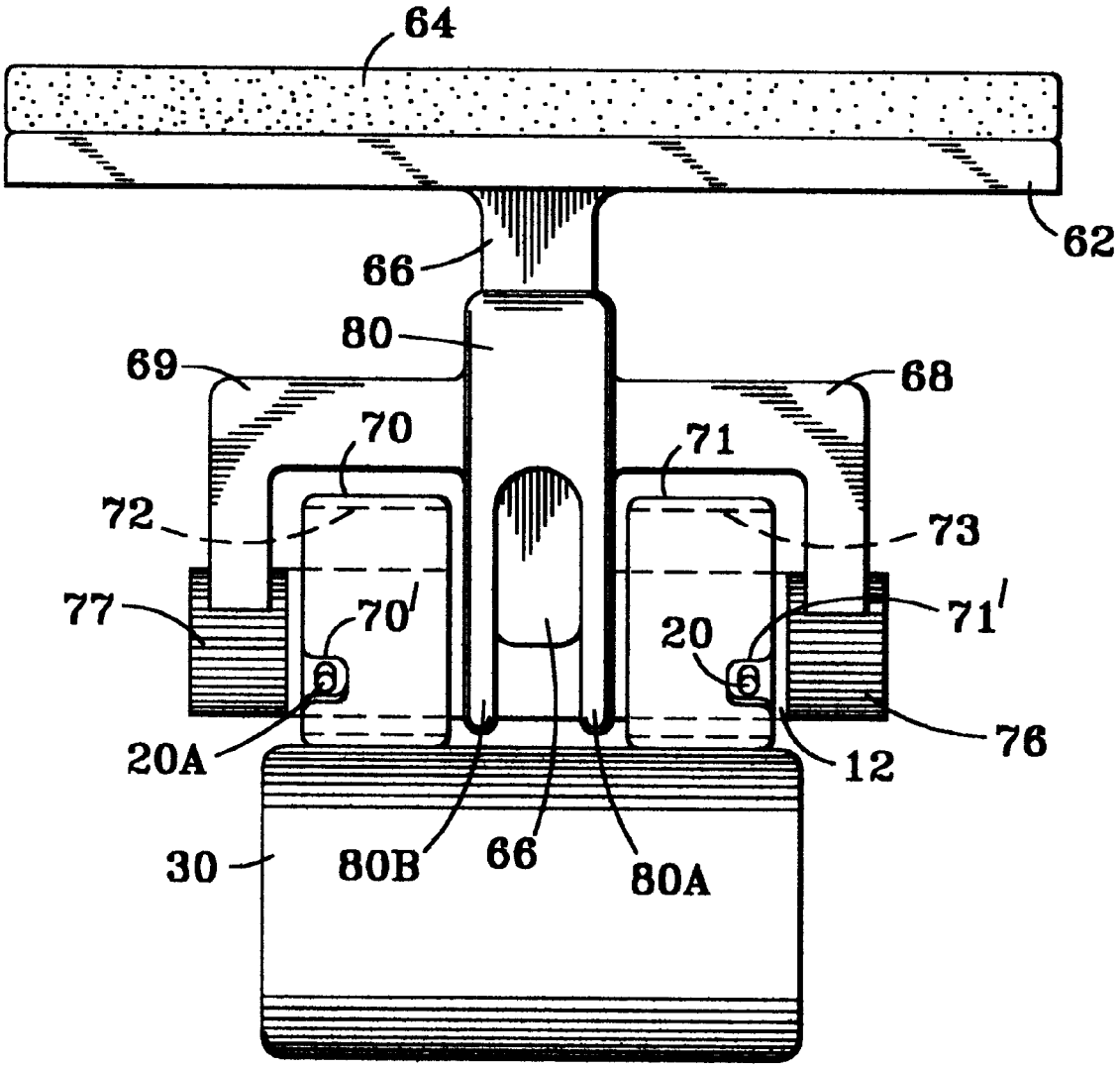
FIG. 7 is a front elevational plan view of an alternative embodiment of the brakeshoe adjustor assembly shown in FIG. 5.

FIG. 7 shows an alternative embodiment for bracket 24 and the brakeshoe adjustor assembly of FIG. 5 whereby pawls 68 and 69 are positioned on both sides of bracket 80 for corresponding engagement with ratchet teeth 76 and 77, respectively, provided on both ends of spindle 12. In this configuration, spindle 12 is extended through and beyond each roller 72 and 73 and fixedly secured therein either by conventional means or by pins 20 and 20A in the same manner as described for the configuration illustrated in FIG. 5. Bracket extensions 80A and 80B are provided with appropriate openings for the insertion of spindle 12 therethrough. The arrangement of the remainder of brakeshoe adjustor components, roller sleeves 70 and 71, rollers 72 and 73, pins 20 and 20A, and arcuate slots 70' and 71', are the same as shown in FIG. 5.

FIG. 6 shows the self adjusting brakeshoe adjustors engaged with pawls 68 and 68A which are mounted directly to the side of single webs 66 and 67, respectively. The advantage of this configuration is that the need for a bracket, such as those illustrated in FIGS. 4 and 6, is obviated. As with the brakeshoe adjustor used in the double web configurations of FIGS. 1–3, the use of a bracket allows the brakeshoe adjustor to be easily incorporated into existing brake assemblies without the need for redesigning the brakeshoe web for direct attachment of pawls 66 and 67. The bracket arrangement also provides additional support for securing spindle 12 into place at the end 79 of single webs 66 and 67.

Securement of the assembled self adjusting brakeshoe adjustor onto the end of web 79 (FIG. 6) is accomplished by the engagement of the roller sleeves 70,71 with S-cam 30 or by means of a wire clip (not shown) attached to bracket 24 and web 66 or 67, as the case may be. In the event no bracket is used, as with the configuration shown in FIG. 6, a spring clip (not shown) may be mounted onto the brakeshoe adjustor for engagement with the end of web 79.

Figure 11:
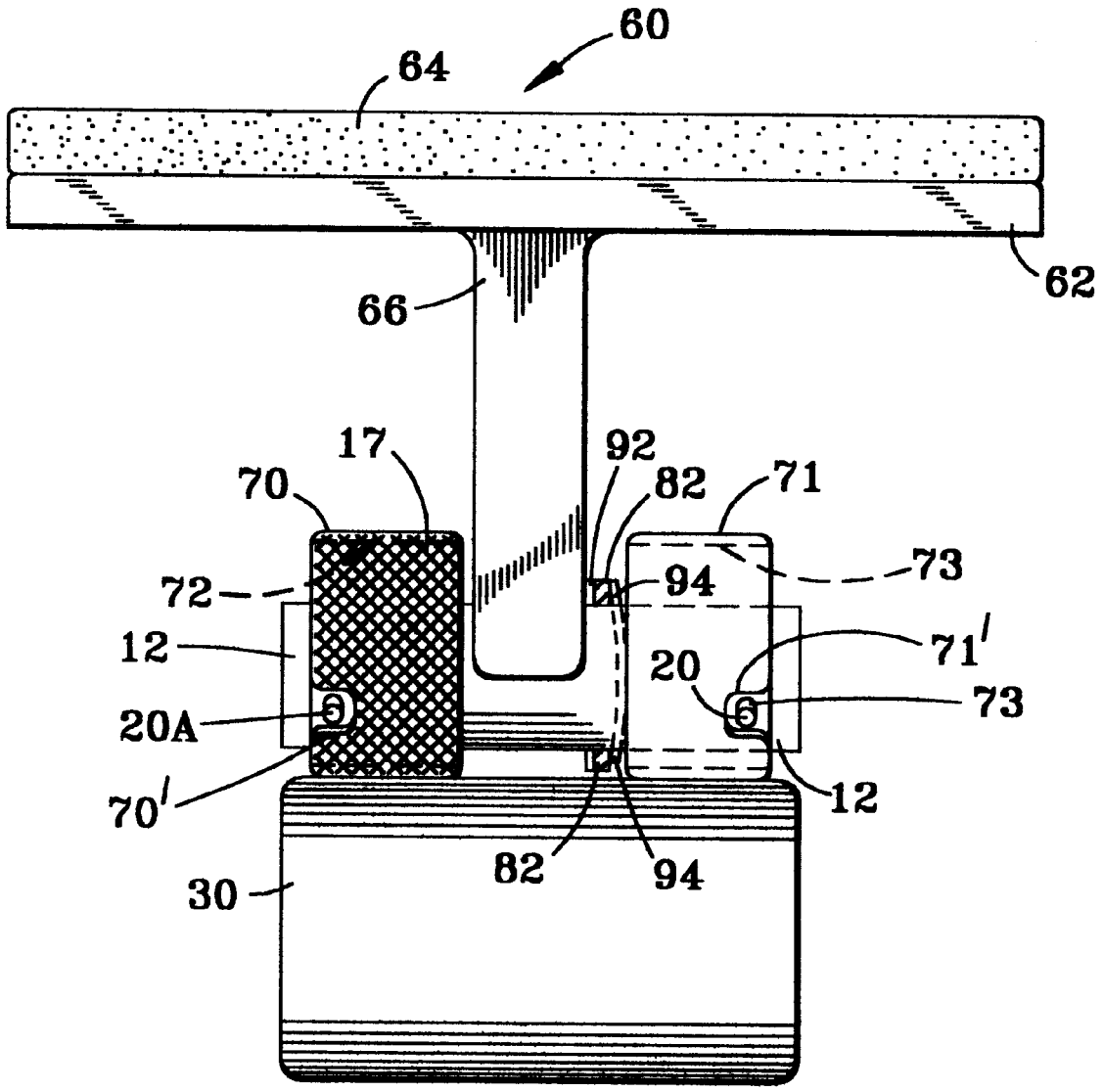
FIG. 11 is a front elevational plan view of the brakeshoe adjustor and pawl assembly shown in FIG. 9 adapted for use with the single web brakeshoe illustrated in FIG. 6.
Figure 12:
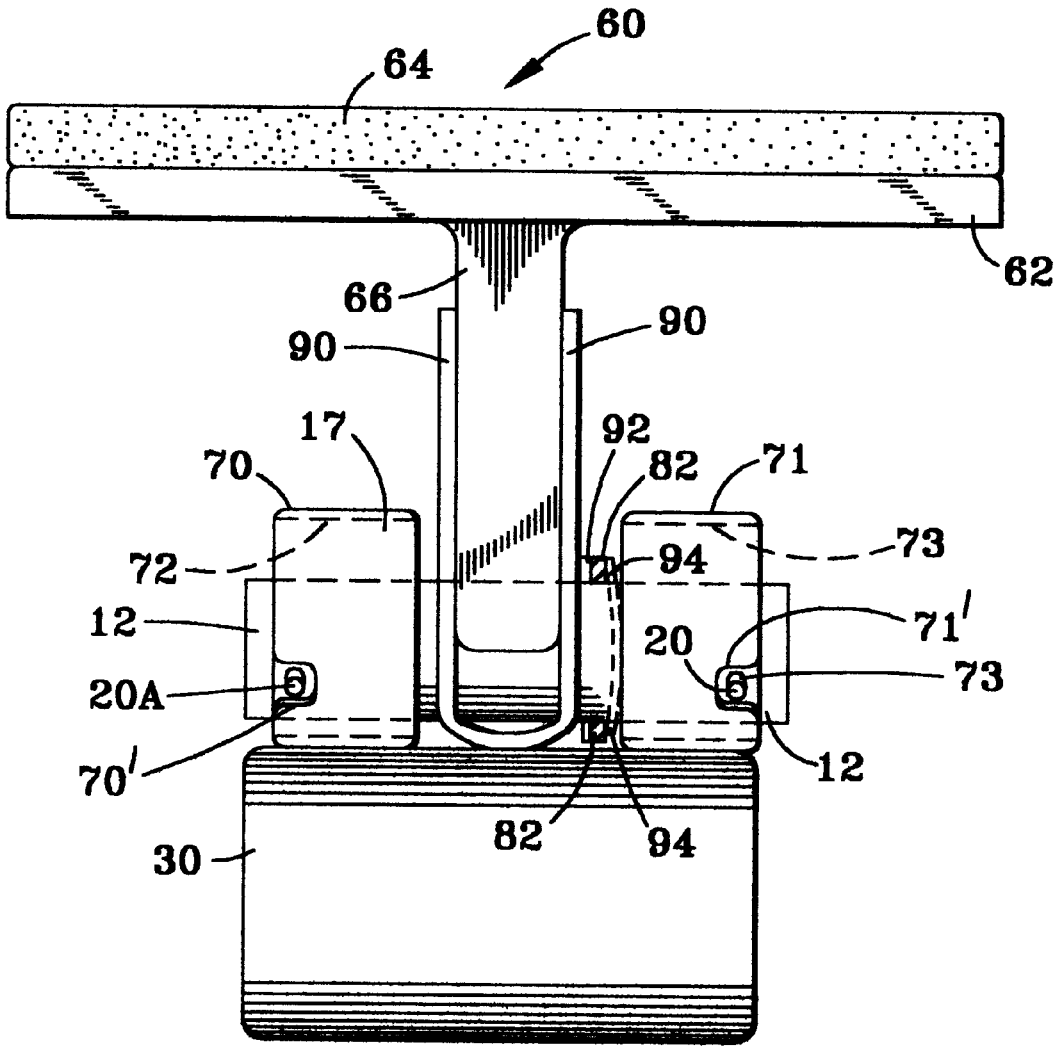
FIG. 12 is a front elevational plan view of the brakeshoe adjustor shown in FIG. 11 incorporating a bracket arrangement for the pawl assembly also shown in FIG. 11.

As shown in FIGS. 11 and 12, the ratchet wheel 82 of the ratchet means can also be used in conjunction with the brakeshoe adjustor for a single web brakeshoe. FIG. 11 illustrates a pawl 92 secured directly to the side of single web 66 for engaging ratchet wheel 82. The ratchet wheel is held engaged with pawl 92 by means of a circular disc spring 94 mounted onto spindle 12 such that the presence of the roller and roller sleeve combination will provide the requisite support for urging disc spring 94 against annular ratchet wheel 82 to secure such engagement.

The configuration illustrated in FIG. 12 is identical to that shown in FIG. 11 with the exception that a U-shaped bracket 90 having pawl 92 secured to the side thereof is mounted onto single web 66. Bracket 90 is provided with the appropriate openings for having spindle 12 inserted therethrough. The ratchet wheel 82 is held engaged with pawl 92 in similar fashion by means of disc spring 94 mounted onto spindle 12 between bracket 90 and the roller and roller sleeve combination, 73 and 71.

To insure proper functioning of the brakeshoe adjustor during operation, an annular ratchet wheel and pawl assembly, identical to a mirror image of that set forth in FIGS. 11 and 12, may be added on the other side of the single web (not shown), i.e., between the roller and roller sleeve combination, 73 and 71, and single web 66.

The material used for the various components of the self adjusting brakeshoe adjustor is a metal whose structural integrity is capable of withstanding the force exerted by operation of the S-cam against the roller sleeve(s), and which will withstand the corrosive effects normally encountered during vehicle operation. The preferred metal is stainless steel, although other metals of a similar nature can be utilized.

The operation of any of the illustrated self-adjusting brakeshoe adjustors according to the invention herein, is achieved by the normal functioning of the cam-operated brakes typically employed on heavy duty vehicles. As already noted hereinbefore, and as shown in FIG. 2, a pair of brakeshoe adjustors is required for the proper functioning of the brakeshoes 39 and 40. Thus, when the vehicle's brake pedal is depressed by its operator, air under pressure is caused to be supplied to the air brake chamber (not shown), thereby transmitting a braking force to cam shaft 32 via the action of a push rod and brake lever (also not shown).

By additionally referring to FIGS. 3 and 4, once cam shaft 32 (shown in FIG. 2) is rotated, the S-cam 30 at the end thereof simultaneously rotates against roller sleeves 16 of each brakeshoe adjustor engaged at the end of each brakeshoe webs 41, 42 and 43,44. The outside surface of the roller sleeves for both arrangements of the single and double web brakeshoe adjustors are preferably knurled as indicated by the numeral 17 in FIGS. 1, 1A, 8 and 11. The actuation of S-cam 32 against roller sleeve 16 of each brakeshoe adjustor, causes roller sleeve 16 to rotate about roller 10, and operates to expand brakeshoes 39 and 40 for making contact of the brake linings 46 and 48, supported by brakeshoe lining support plates 45 and 47, respectively, with the brake drum (not shown), thereby causing the rotating wheels of the vehicle to come to a halt. The arcuate distance that roller sleeve 16 must travel, or the distance that the brakeshoes 39 and 40 must expand outward about pins 54 and 56, represents the distance or "play" that the push rod must travel before brakeshoes 39 and 40 engage the brake drum. Once contact is made between the brake linings and brake drum, the rotation of S-cam 30 and roller sleeve 16 (and roller sleeves 70 and 71 in the case of the single web arrangement) will cease.

The distance that brakeshoes 39 and 40 must expand outward about pins 54 and 56 will gradually increase due to the wear of the brake linings 46 and 48 coming into repeated contact with the brake drum. This will cause roller sleeves 16 and 70 and 71 to rotate further in order to make the necessary contact of the brake lining of the brakeshoe with the brake drum. Eventually, roller sleeve 16 (and 70 and 71) will make contact with corresponding pins 20 and [20'] *20A*, thereby actuating the eccentric roller and spindle arrangement. Once eccentric roller 10 (and 72 and 73), and thus spindle 12, is rotated, the brakeshoe lining will expand outwardly until the brake lining makes contact with the brake drum. After the brake is released by the vehicle operator, the distance between the brake lining and brake drum will be maintained by the engagement of pawl 26 with ratchet 14 at the end of spindle 12 to prevent spindle 12 from rotating back to its original position before being advanced by its corresponding roller sleeve. Thus, each engagement with the next ratchet tooth by pawl 26 will reflect a corresponding amount of wear experienced by the respective brake lining.

Stated another way, the arcuate distance of slot 18 (FIGS. 3, 4, 9 and 10) and slots 70' and 71' (FIGS. 5, 7, 11 and 12) represents the maximum distance that S-cam 30, and roller sleeve 16 and roller sleeves 70 and 71, can travel before engaging pins 20 and 20' to advance the eccentric rotation of spindle 12 for maintaining the proper clearance of the brake lining with the brake drum. Automatic adjustment of the brakeshoe is thereby achieved in an efficient and economical manner with a minimum of moving parts.

It will be readily seen that the ratchet and pawl assemblies represented in FIGS. 8 through 12 are another way of maintaining the rotational advance of spindle 12 for maintaining the proper clearance between the brake lining and brake drum.

In order to maintain a proper or predetermined distance between the brake linings and brake drum (when the brakes are not applied), the eccentric distance between the axis of spindle 12 and the axis of roller 10 (and rollers 72 and 73 in the single web configurations) will represent the maximum distance that the brakeshoes can be outwardly expanded for adjustment before making contact with the brake drum. This distance must be at least as great as the thickness of the brake lining in order that the distance between the brake lining and the brake drum will always be maintained. Thus, the diameter of roller 10 (double web) and rollers 72 and 73 (single web) in relation to the eccentric positioning of spindle 12 will vary depending on the diameter size of brakeshoes 39 and 40 and corresponding brake linings 48 and 46.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A brakeshoe adjustor actuated by a cam for use with a double web brakeshoe comprising a) a roller assembly comprising (i) a spindle axially extended on both sides of, and fixed with, a cylindrical eccentric roller for engagement with the end portions of the double web brakeshoe; and (ii) at least one ratchet means disposed about said spindle;

b) a cylindrical roller sleeve for tangential engagement with said cam and for slidably receiving said eccentric roller therein;

c) means for limiting the rotation of said sleeve about said eccentric roller by a predetermined amount when said sleeve is actuated by said cam; and d) a pawl assembly comprising i) at least one bracket sleeve for slidable engagement with a corresponding web end of said brakeshoe and having an opening for slidably receiving one extension of said spindle therethrough; and ii) at least one pawl secured to said bracket sleeve for engagement with the ratchet means about said spindle to permit rotation of said spindle and eccentric roller in one direction only.

2. The brakeshoe adjustor according to claim 1 wherein said means for limiting the rotation of said sleeve about said eccentric roller comprises at least one pin extending from said eccentric roller at a point proximate to an end thereof, and said roller sleeve comprises at least one arcuate slot within an end thereof for receiving said extending pin of said eccentric roller to permit a corresponding arcuate rotation of said sleeve about said eccentric roller when said sleeve is actuated by said cam.

3. The brakeshoe adjustor according to claim 1 wherein said pawl is secured about the end portion of at least one of said brakeshoe webs for engagement with the ratchet means about said spindle to permit rotation of said spindle in one direction only.

4. The brakeshoe adjustor according to claims 1 or 3 wherein the pawl assembly comprises a plurality of pawls.

5. The brakeshoe adjustor according to claims 1 or 3 wherein said ratchet means comprises a plurality of ratchet teeth about the surface of said spindle for engagement with said pawl(s).

6. The brakeshoe adjustor according to claims 1 or 3 wherein said ratchet means comprises an annular ratchet wheel for mounting onto said spindle and having a plurality of ratchet[s] teeth extending from substantially the annular wheel's inner circumference to its outer circumference, for engagement with said pawl.

7. The brakeshoe adjustor according to claim 2 wherein said eccentric roller has a plurality of pins extending therefrom and said roller sleeve has a corresponding number of arcuate slots for respective engagement with said pins.

8. The brakeshoe adjustor according to claim 7 wherein said pins extend from said eccentric roller substantially circumferentially equidistant with respect to each other and said roller sleeve has a corresponding number of arcuate slots for respective engagement with said pins.

9. The brakeshoe adjustor according to claim 1 wherein the pawl assembly is provided for each web of said double web brakeshoe and said ratchet means comprises a plurality of ratchet teeth about both end portions of said spindle for engagement with the respective pawl of said pawl assemblies.

10. The brakeshoe adjustor according to claim 9 wherein said ratchet means comprises a corresponding number of annular ratchet wheels and bracket sleeves.

11. A brakeshoe adjustor actuated by a cam for use with a single web brakeshoe comprising a) a roller assembly comprising (i) a spindle for engagement with the end portion of the single web brakeshoe at a point between a pair of cylindrical eccentric rollers fixedly secured to said spindle in spaced apart relationship; and (ii) at least one ratchet means secured in fixed relationship about said spindle;

b) a corresponding pair of cylindrical roller sleeves for tangential engagement with said cam and for slidably receiving said eccentric rollers therein;

c) means for limiting the rotation of at least one of said sleeves about its corresponding eccentric roller by a predetermined amount when said sleeve is actuated by said cam; and d) a pawl assembly comprising i) a bracket sleeve for slidable engagement with the web end of said brakeshoe, said bracket sleeve having at least one opening therein for slidably receiving said spindle therethrough; and ii) at least one pawl secured to at least one side of said bracket sleeve for engagement with said ratchet means about said spindle to permit rotation of said spindle and eccentric rollers in one direction only.

12. The brakeshoe adjustor according to claim 11 wherein said means for limiting the rotation of said roller sleeve about its corresponding eccentric roller comprises at least one pin extending from at least one of said eccentric rollers at a point proximate to an end thereof, and said roller sleeve comprises at least one arcuate slot within an end thereof for receiving said extending pin of said eccentric roller to permit a corresponding arcuate rotation of said sleeve about said eccentric roller when said sleeve is actuated by said cam.

13. The brakeshoe adjustor according to claim 11 wherein said pawl is secured about the end portion of said brakeshoe web for engagement with the ratchet means about said spindle to permit rotation of said spindle and eccentric rollers in one direction only.

14. The brakeshoe adjustor according to claim 11 or 13 wherein the pawl assembly comprises a plurality of pawls.

15. The brakeshoe adjustor according to claim 11 or 13 wherein said spindle extends beyond at least one of said eccentric rollers in an axial direction and said ratchet means comprises a plurality of ratchet teeth about the axial surface of said spindle extension for engagement with said pawl(s).

16. The brakeshoe adjustor according to claim 11 wherein said spindle extends beyond both eccentric rollers in an axial direction and said ratchet means comprises a plurality of ratchet teeth about the axial surface of both spindle extensions for engagement with at least one pawl fixed to each side of said bracket sleeve for engagement with said ratchet teeth.

17. The brakeshoe adjustor according to claim 11 or 13 wherein said ratchet means comprises at least one annular ratchet wheel fixedly mounted to said spindle for engagement with said pawl(s).

18. The brakeshoe adjustor according to claim 11 wherein said ratchet wheel is fixedly mounted to said spindle at a point between said bracket sleeve and said eccentric roller.

19. The brakeshoe adjustor according to claim 13 wherein said ratchet wheel is fixedly mounted to said spindle at a point between said brakeshoe web and said eccentric roller.

20. The brakeshoe adjustor according to claim 12 wherein both eccentric rollers have at least one pin extending therefrom at a point proximate to an end of each respective roller.

21. The brakeshoe adjustor according to claim 20 wherein both eccentric rollers have a plurality of pins and said corresponding roller sleeves have a corresponding number of arcuate slots for respective engagement with said pins.

22. The brakeshoe adjustor according to claim 21 wherein said pins of each eccentric roller are substantially circumferentially equidistant with respect to each other and said corresponding roller sleeves have a corresponding number of arcuate slots for respective engagement with said pins.

23. The brakeshoe adjustor according to claims 2 or 12 wherein the outside surface of said roller sleeve has a knurled surface.

24. The brakeshoe adjustor according to claims 11 or 13 wherein said spindle and eccentric rollers are prevented from turning in the direction of actuation of said cam *shaft*.

*25. A cam actuated brakeshoe adjustor for use with a double web brakeshoe comprising*

*a) a roller assembly comprising (i) a spindle axially extended on both sides of, and fixed with, a cylindrical eccentric roller for engagement with the end portions of a double web brakeshoe; and (ii) at least one ratchet means disposed about said spindle;*

*b) housing means for tangential engagement with said cam and configured to receive and permit rotation of said eccentric roller therein;*

*c) means for limiting the rotation of said housing means about said eccentric roller by a predetermined amount; and*

*d) means operatively engaged with said ratchet means for permitting rotation of said spindle and eccentric roller in one direction only when said housing means is actuated by said cam shaft.*

*26. The brakeshoe adjustor according to claim 25 wherein said housing means comprises a cylindrical roller sleeve configured to slidably receive said eccentric roller therein.*

*27. The brakeshoe adjustor according to claim 26 wherein said means for limiting the rotation of said sleeve about said eccentric roller comprises at least one pin extending from said eccentric roller proximate to an end thereof, said roller sleeve including at least one arcuate slot within an end thereof for receiving said extending pin of said eccentric roller to permit a corresponding arcuate rotation of said sleeve about said eccentric roller when said sleeve is actuated by said cam shaft.*

*28. The brakeshoe adjustor according to claim 25 wherein the means for permitting rotation of the spindle and eccentric roller in one direction only is secured about the end portion of least one of said brakeshoe webs.*

*29. The brakeshoe adjustor according to claim 28 which comprises at least one pawl secured to the end portion of at least one of said brakeshoe webs.*

*30. The brakeshoe adjustor according to claim 25 which additionally comprises means for maintaining the roller assembly in constant engagement with the end portions of the double web brakeshoe.*

*31. The brakeshoe adjustor according to claim 30 which comprises at least one bracket sleeve for slidable engagement with a corresponding web end of said brakeshoe and having an opening for slidably receiving one extension of said spindle therethrough.*

*32. The brakeshoe adjustor according to claim 30 which comprises a spring clip disposed about the spindle extensions and secured to the web end of said brakeshoe.*

*33. The brakeshoe adjustor according to claim 31 wherein said bracket sleeve and means for permitting rotation of said*

*spindle and eccentric roller in one direction only are integrated with each other.*

*34. The brakeshoe adjustor according to claim 25 wherein said ratchet means comprises a plurality of ratchet teeth about the surface of said spindle.*

*35. The brakeshoe adjustor according to claim 25 wherein said ratchet means comprises an annular ratchet wheel for mounting onto said spindle and having a plurality of ratchet teeth extending from substantially the annular wheel's inner circumference to its out circumference.*

*36. The brakeshoe adjustor according to claim 27 wherein said eccentric roller has a plurality of pins extending therefrom and said roller sleeve has a corresponding number of arcuate slots for respective engagement with said pins.*

*37. The brakeshoe adjustor according to claim 36 wherein said pins extending from the eccentric roller are substantially circumferentially equidistant with respect to each other and said roller sleeve has a corresponding number of arcuate slots for respective engagement with said pins.*

*38. The brakeshoe adjustor according to claim 25 wherein the outside surface of said roller sleeve has a knurled surface.*

*39. The brakeshoe adjustor according to claim 25 wherein said spindle and eccentric rollers are prevented from turning in the direction of actuation of said cam shaft.*

*40. A cam actuated brakeshoe adjustor for use with a single web brakeshoe comprising*

*a) a roller assembly comprising (i) a spindle for engagement with the end portion of a single web brakeshoe at a point between a pair of cylindrical eccentric rollers fixedly secured to said spindle in spaced apart relationship; and (ii) at least one ratchet means secured in fixed relationship about said spindle;*

*b) housing means for tangential engagement with said cam and configured to receive and permit rotation of at least one of said eccentric rollers therein;*

*c) means for limiting the rotation of said housing means about the eccentric rollers by a predetermined amount; and*

*d) means operatively engaged with said ratchet means for permitting rotation of said spindle and eccentric rollers in one direction only when said housing means is actuated by said cam shaft.*

*41. The brakeshoe adjustor according to claim 40 wherein said housing means comprises at least one cylindrical roller sleeve correspondingly configured to slidably receive at least one of said pair of eccentric rollers therein.*

*42. The brakeshoe adjustor according to claim 40 wherein said housing means comprises a pair of cylindrical roller sleeves correspondingly configured to slidably receive said pair of eccentric rollers therein.*

*43. The brakeshoe adjustor according to claim 42 wherein said means for limiting the rotation of said roller sleeves about their corresponding eccentric rollers comprises at least one pin extending from at least one of said eccentric rollers proximate to an end thereof, said roller sleeve comprising at least one arcuate slot within an end thereof for receiving said extending pin of said eccentric roller to permit a corresponding arcuate rotation of said sleeve about its corresponding eccentric roller when said sleeve is actuated by said cam shaft.*

*44. The brakeshoe adjustor according to claim 40 wherein the means for permitting rotation of the spindle and eccentric rollers in one direction only is secured about the end portion of said brakeshoe web.*

*45. The brakeshoe adjustor according to claim 44 which comprises at least one pawl secured to the end portion of said brakeshoe web.*

*46. The brakeshoe adjustor according to claim 40 which additionally comprises means for maintaining the roller assembly in constant engagement with the end portion of said single web brakeshoe.*

*47. The brakeshoe adjustor according to claim 46 wherein the means for maintaining the roller assembly in constant engagement with the end portion of said single web brakeshoe comprises a bracket sleeve for slidable engagement with the corresponding web end of said brakeshoe, said bracket sleeve having an opening for slidably receiving said spindle therethrough.*

*48. The brakeshoe adjustor according to claim 46 which comprises a spring clip disposed about the spindle extensions and secured to the web end of said brakeshoe.*

*49. The brakeshoe adjustor according to claim 46 wherein said means for maintaining the roller assembly in constant engagement with the end portion of said single web brakeshoe and means for permitting rotation of said spindle and eccentric roller in one direction only are integrated with each other.*

*50. The brakeshoe adjustor according to claim 40 wherein said spindle extends beyond at least one of said eccentric rollers in an axial direction and said ratchet means comprises a plurality of ratchet teeth about the axial surface of said spindle extension.*

*51. The brakeshoe adjustor according to claim 40 wherein said spindle extends beyond both eccentric rollers in an axial direction and said ratchet means comprises a plurality of ratchet teeth about the axial surface of both spindle extensions.*

*52. The brakeshoe adjustor according to claim 40 wherein said ratchet means comprises at least one annular ratchet wheel fixedly mounted to said spindle.*

*53. The brakeshoe adjustor according to claim 52 wherein said ratchet wheel is fixedly mounted to said spindle at a point between said bracket and said eccentric roller.*

*54. The brakeshoe adjustor according to claim 52 wherein said ratchet wheel is fixedly mounted to said spindle at a point between said brakeshoe web and said eccentric roller.*

*55. The brakeshoe adjustor according to claim 43 wherein each eccentric roller has at least one pin extending therefrom at a point proximate to an end of each respective roller.*

*56. The brakeshoe adjustor according to claim 55 wherein each eccentric roller has a plurality of pins and said corresponding roller sleeves have a corresponding number of arcuate slots for respective engagement with said pins.*

*57. The brakeshoe adjustor according to claim 56 wherein said pins of each eccentric roller are substantially circumferentially equidistant with respect to each other and said corresponding roller sleeves have a corresponding number of arcuate slots for respective engagement with said pins.*

*58. The brakeshoe adjustor according to claim 40 wherein the outside surface of said housing means has a knurled surface.*

*59. The brakeshoe adjustor according to claim 43 wherein the outside surface of said roller sleeves has a knurled surface.*

*60. The brakeshoe adjustor according to claim 40 wherein said spindle and eccentric rollers are prevented from turning in the direction of actuation of said cam shaft.*

* * * * *